US007255233B2

(12) United States Patent
Daniels et al.

(10) Patent No.: US 7,255,233 B2
(45) Date of Patent: Aug. 14, 2007

(54) METHOD AND APPARATUS FOR SEPARATING MIXED PLASTICS USING FLOTATION TECHNIQUES

(75) Inventors: Edward J. Daniels, Orland Park, IL (US); Bassam J. Jody, Tinley Park, IL (US); Joseph A. Pomykala, Jr., Plainfield, IL (US)

(73) Assignee: UChicago Argonne LLC, Chicago, IL (US)

( * ) Notice: Subject to any disclaimer, the term of this patent is extended or adjusted under 35 U.S.C. 154(b) by 428 days.

(21) Appl. No.: 10/866,963

(22) Filed: Jun. 14, 2004

(65) Prior Publication Data

US 2005/0274651 A1 Dec. 15, 2005

(51) Int. Cl.
*B03B 5/60* (2006.01)
*B03D 1/00* (2006.01)

(52) U.S. Cl. ............. 209/162; 209/172; 209/155; 209/12.1; 209/930; 209/913

(58) Field of Classification Search ............ 209/155, 209/157, 162, 172, 173, 930, 932, 933, 913, 209/12.1, 146
See application file for complete search history.

(56) References Cited

U.S. PATENT DOCUMENTS

| | | | | |
|---|---|---|---|---|
| 3,568,839 A | * | 3/1971 | Dunlea | 210/194 |
| 4,352,732 A | * | 10/1982 | Massicotte | 209/17 |
| 4,809,854 A | * | 3/1989 | Tomaszek | 209/3 |
| 4,961,842 A | * | 10/1990 | Schulz et al. | 209/155 |
| 5,048,693 A | * | 9/1991 | Zaltzman | 209/137 |
| 5,255,859 A | * | 10/1993 | Peacock et al. | 241/79.1 |
| 5,339,961 A | * | 8/1994 | Mayhak | 209/3 |
| 5,358,119 A | * | 10/1994 | Stahl et al. | 209/3.1 |
| 5,653,867 A | | 8/1997 | Jody et al. | |
| 5,875,898 A | * | 3/1999 | Fry | 209/28 |
| 5,984,105 A | * | 11/1999 | Lease et al. | 209/37 |
| 6,298,579 B1 | * | 10/2001 | Ichitani et al. | 34/565 |
| 6,352,159 B1 | * | 3/2002 | Loshe | 209/268 |
| 6,460,788 B1 | * | 10/2002 | de Feraudy | 241/19 |
| 6,599,950 B2 | | 7/2003 | Jody et al. | |
| 6,994,221 B2 | * | 2/2006 | Tse | 209/663 |
| 2003/0136711 A1 | * | 7/2003 | MacNeil | 209/510 |
| 2004/0035757 A1 | * | 2/2004 | Vandeputte | 209/44 |
| 2005/0173309 A1 | * | 8/2005 | Bork et al. | 209/172 |

* cited by examiner

*Primary Examiner*—Patrick Mackey
*Assistant Examiner*—Mark Hageman
(74) *Attorney, Agent, or Firm*—Joan Pennington

(57) ABSTRACT

A method and apparatus are provided for separating mixed plastics using flotation techniques including a first stage initial washing tank for washing of incoming plastics and providing a first separation process and at least one separation module. The first stage initial washing tank includes a perforated basket to hold heavy materials, such as metals, glass, and the like. Each separation module includes a separation tank, a feeding section for feeding of mixed stream into the separation tank; and a collecting section for collecting of the separated mixed plastics including floaters and sinkers from the separation tank. The separation tank has no moving parts. Each separation tank and the first stage initial washing tank is a standard off-the-shelf circular tank with a flat bottom. Washing and drying steps are eliminated between separation stages. Batch processing is replaced with generally continuous operation. An integrated vibrating screen and air classification system is provided.

18 Claims, 6 Drawing Sheets

METHOD AND APPARATUS FOR SEPARATING MIXED PLASTICS USING FLOTATION TECHNIQUES

CONTRACTUAL ORIGIN OF THE INVENTION

The United States Government has rights in this invention pursuant to Contract No. W-31-109-ENG-38 between the United States Government and Argonne National Laboratory.

FIELD OF THE INVENTION

The present invention relates to an improved method and apparatus for separating different types of mixed plastics, including plastics having overlapping densities. More specifically this invention relates to an improved method and apparatus for the separation of mixed plastics including plastics that have similar or overlapping densities such as acrylonitrile butadiene styrene (ABS) and high impact polystyrene (HIPS) from each other.

DESCRIPTION OF THE RELATED ART

The recycling of automobiles and white goods, such as refrigerators and electronics in the United States and Europe, involves the shredding of these items after removal of certain components such as the bulk refrigerants. The metallic content of the shredded material is then separated and recycled and the non-metallic residue that was once considered waste and sent to land fill, is now recovered, separated, cleaned and recycled. The predominant plastics include polypropylene, polyethylene, polyvinyl chloride, ABS, HIPS, ABS/PC, PC, and Nylons. Some of these plastics can be separated from the mixture and from each other based on differences in density. ABS and HIPS have similar and overlapping densities and are not separable by this method based on differences in density and a small amount of contamination of one in the other will severely restrict its commercial value.

U.S. Pat. No. 5,653,867, issued to Jody et al. on Aug. 5, 1997 and assigned to the present assignee, discloses an improved method for separating acrylonitrile butadiene styrene (ABS) and high impact polystyrene (HIPS) plastics from each other. The ABS and HIPS plastics are shredded to provide a selected particle size. The shredded particles of the ABS and HIPS plastics are applied to a solution having a solution density in a predefined range between 1.055 gm/cm.sup.3 and 1.07 gm/cm.sup.3, a predefined surface tension in a range between 22 dynes/cm to 40 dynes/cm and a pH in the range of 1.77 and 2.05. The disclosed method separates ABS and HIPS, two solid thermoplastics which have similar densities, by selectively modifying the effective density of the HIPS using a binary solution with the appropriate properties, such as pH, density and surface tension, such as a solution of acetic acid and water or a quaternary solution having the appropriate density, surface tension, and pH.

U.S. Pat. No. 6,599,950, issued to Jody et al. on Jul. 29, 2003 and assigned to the present assignee, discloses a method of separating a portion of acrylonitrile-butadiene-styrene (ABS) from a mixture containing ABS and for separating a portion of ABS and polycarbonate (PC) from a mixture of plastics containing ABS and PC. The method includes shredding and/or granulating the mixture of plastics containing ABS and PC to provide a selected particle size; sequentially dispersing the shredded mixture of plastics in a series aqueous solutions having different specific gravities and separating the floating fraction until the desired separation is obtained. Surface tension and pH are also variables to be controlled.

The subject matter of both the above-identified U.S. Pat. No. 5,653,867 and U.S. Pat. No. 6,599,950 is incorporated herein by reference.

A principal object of the present invention is to provide an improved method and apparatus for separating mixed plastics using flotation techniques.

Another object of the present invention is to provide an improved method and apparatus for separating acrylonitrile butadiene styrene (ABS) and high-impact polystyrene (HIPS), and other plastics, such as, polypropylene, polyethylene, polyvinyl chloride, polystyrene, and nylon.

SUMMARY OF THE INVENTION

In brief, a method and apparatus are provided for separating mixed plastics using flotation techniques including a first stage initial washing tank for washing of incoming plastics and providing a first separation process and at least one separation module. The first stage initial washing tank includes a perforated basket to hold heavy materials, such as metals, glass, rocks and the like and a filter unit through which the solution is circulated to remove dirt and fines. Each separation module includes a separation tank, a feeding section for feeding of mixed stream into the separation tank; and a collecting section for collecting of the separated mixed plastics including floaters and sinkers from the separation tank. The separation tank has no moving parts.

In accordance with features of the invention, a combination of at least one siphon and a small water pump is used with the separation tank in place of expensive slurry pumps. Each of the separation tanks and the first stage initial washing tank is a standard off-the-shelf circular tank with a flat bottom, rather than an expensive rectangular tank. Washing and drying steps are eliminated between separation stages. Batch processing is replaced with a generally continuous operation.

In accordance with features of the invention, an integrated vibrating screen and air classification system is provided for separating lights including, for example, foamy light materials, wood chips, loose labels, paper chips and plastics fines, from the plastics stream before the plastic stream is processed. Air classification can be achieved by a vacuum system mounted on an adjustable dam carried by the vibrating screen or independent of the adjustable dam. An air jet optionally is provided in an upward direction from below the screen to enhance the upward movement of the lights away from the heavier plastics chips.

In accordance with features of the invention, a single separation tank may also be used to achieve multiple separations in the same tank. A horizontal component or velocity factor is added to the mixed plastics to be separated as the mixed plastics are injected into the separation apparatus containing a separation solution. The separation apparatus includes a plurality of discharge ports for collecting the separated mixed plastics.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
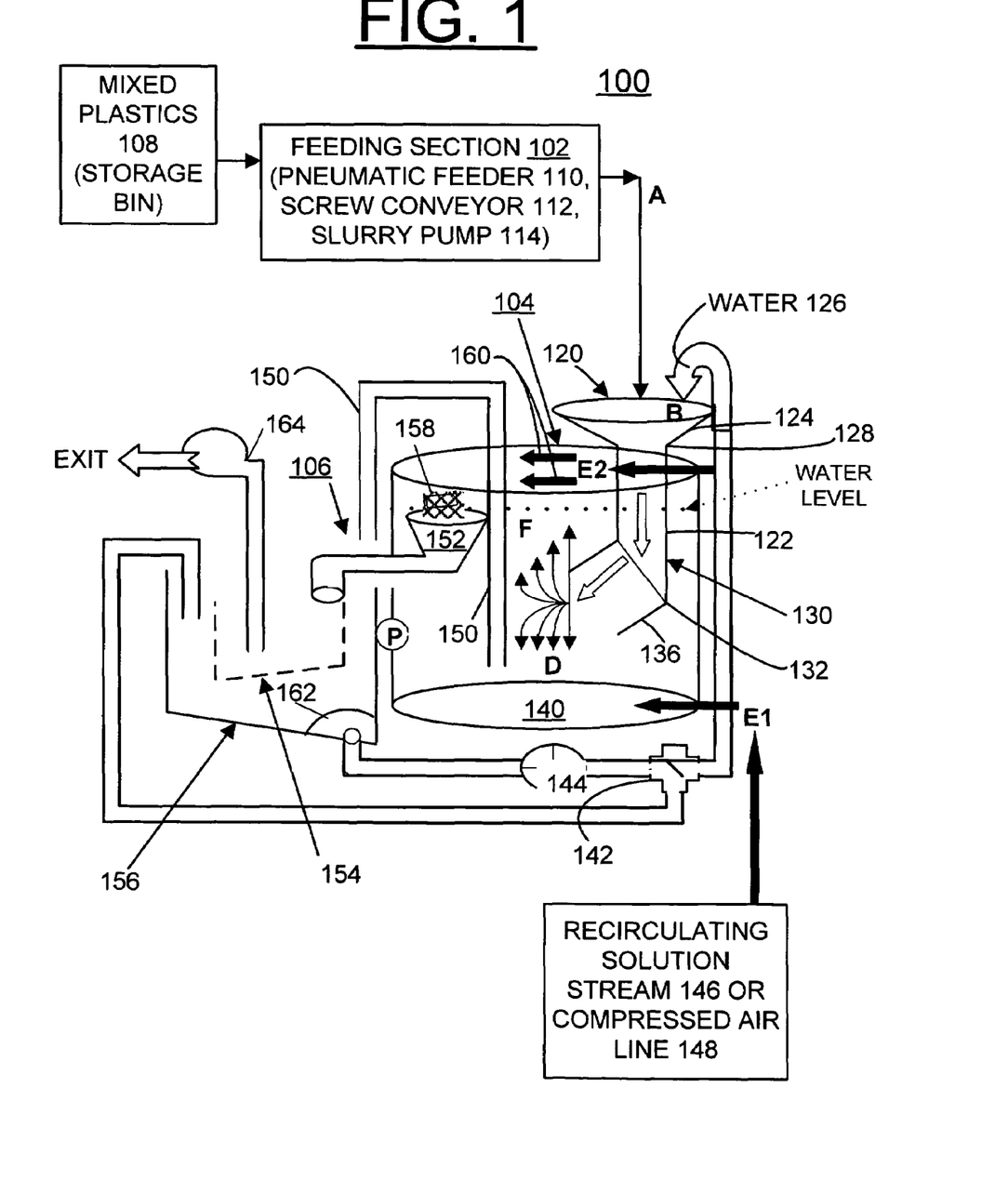
FIG. 1 is a schematic and block diagram of exemplary apparatus not to scale for separating mixed plastics using flotation techniques in accordance with the present invention.

Having reference now to the drawings, in FIG. 1 there is shown exemplary apparatus or separation module for separating mixed plastics using flotation techniques generally designated by the reference character 100 used in a separation system in accordance with the present invention. A plurality of separation modules 100 used in a separation system is essentially similar in design except for the size of the components, with the exception of the tank where the mixture is washed. The chemistry of the solution in each stage is also different.

Each separation module 100 consists of three basic sections generally designated 102, 104, 106 including 1) a feeding section 102 for feeding of mixed stream into a separation tank; 2) a separation tank 104; and 3) a collecting section 106 for collection of the floaters and sinkers from the separation tank.

As shown in FIG. 1, mixed plastics 108, from a bin or from any general storage container, can be fed into the separation tank 104 by the feeding section 102 using a selected one of a pneumatic feeder 110, a screw conveyor 112, or a slurry pump 114. The mixed plastics 108 can be made into a slurry using solution from the separation tank 104 to which the mixed plastics are to be conveyed. The slurry is then pumped into the separation tank 104 with the slurry pump 114. Pneumatic feeders 110, when used, can be driven using either a dedicated compressor or using shop compressed air when available. The compressed air must be free of oil. Presence of oil could affect the efficiency with which the plastics are separated downstream.

Pneumatic feeders 110 and screw conveyors 112, several types of each are commercially available, are more economical to use than slurry systems 114 and require less maintenance and consume less energy. In the preferred embodiment, screw conveyors 112 are provided.

As shown in FIG. 1, the mixed plastics 108 are conveyed into a vertical feeding tube 120 indicated by arrows labeled A. The Vertical feeding tube 120 has a portion 122 that is located below a level of the solution indicated by dotted line labeled WATER LEVEL in tank 104 and has a portion 124 above the solution level. A rectangular duct could be used, instead of a circular tube for feeding tube 120. However, a circular feeding tube 120 is preferred due to a cost advantage, a lower pressure drop and less chances of plugging.

Recirculation water 126 is also delivered along with the mixed plastics 108 into the tube 120 as indicated at arrow labeled B. The recirculation water 126 helps push the plastics 108 into the tank 104 and wets the plastics and conditions their surfaces while in route to be separated. Delivering the recirculation water 126 over the plastics 108 in tube 120 is also favored over delivering the water directly into the tank 104 in order to minimize turbulence in the tank by reducing the velocity and amount of water delivered at a given location in the tank. Tube 120 can be moved upward or downward to accommodate different types and compositions of the mixed plastics 108. Tube 120 can also be mounted at an angle instead of vertically. This could be used to increase the cross sectional area of the plastics' discharge zone at a given elevation, into the tank 104. Tube 120 is also mounted along one end 128 of a diameter line 130 and the floating materials or floaters indicated by arrows labeled F are collected at a second opposite end 132 of this line, in order to maximize the residence time of the plastic chips 108 in the tank 104 and to increase the utilization of the tank's volume. An appropriately sized discharge duct 136 is also attached to the bottom end 132 of the vertical tube 120 at a selected angle, for example, between 30° and 135°, to help increase the area through which the plastics 108 and water 126 are discharged which will reduce the discharge velocity and limit the turbulence to the small area adjacent to the discharge duct 132, and to help spread the plastics 108 over a wider region in the tank 104.

As shown in FIG. 1, the separation tank 104 preferably is a flat bottom circular tank that is selected over commonly used rectangular tanks or conical bottom circular tanks because of the cost advantage of flat bottom circular tanks, even though the conical bottom circular tank is more convenient for recovering the sinkers. Separation tank 104 holds the appropriate solution for separating the mixed plastics 108. Mixed plastics 108 leaving feeding tube 120 will separate in the tank into floaters F and sinkers indicated by arrows D. Fluid motion in the tank 104 toward the discharge side will also direct the floaters F towards a conical discharge line 152 to collect the floating plastics. The sinkers D will be scattered at a bottom 140 of the tank 104, with more of the sinkers D toward the half that contains tube 120. Separation tank 104 also contains the monitoring and control devices (not shown) for specific gravity, surface tension and pH. Separation tank 104 is also equipped with a level indicator (not shown) to modulate a flow splitting valve 142 downstream of a pump 144. A manually adjusted valve can also be used instead of the flow-splitting valve 142 to reduce cost.

A small stream 146 of recirculating solution from the tank 104 or a compressed air line 148 indicated by arrow E1 is also mounted at the bottom 140 of the tank in order to push the sinkers D toward a siphon 150 and to fluidize the residual sinkers at the end of a run so that they could be easily removed. The same return solution pump 144 also drives this recirculating solution stream 146. Compressed air 148 can also be used but it is more expensive.

A perforated plate is also installed in tank 104 (not shown in FIG. 1) at an angle to allow oils and grease to float and be isolated from the region where the plastics float and get collected. The purpose here is to prevent the cleaned plastics from coming in contact with the floating oily layer as the plastics are collected. The oily layer is continuously removed by a small pump and fed to a water/oil separator to separate the oils. The water is then returned to the tank.

Figure 2:
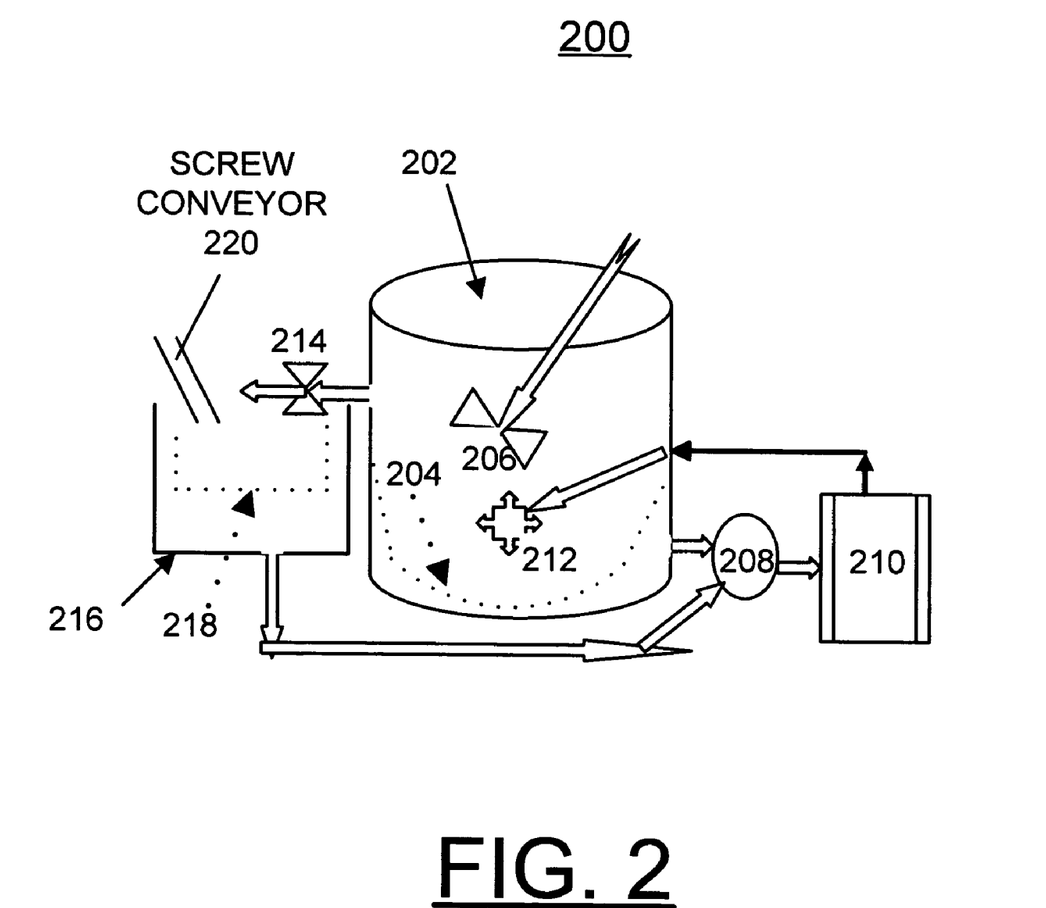
FIG. 2 is a schematic diagram of an exemplary first stage wash tank not to scale for separating mixed plastics in accordance with the present invention.
Figure 3:
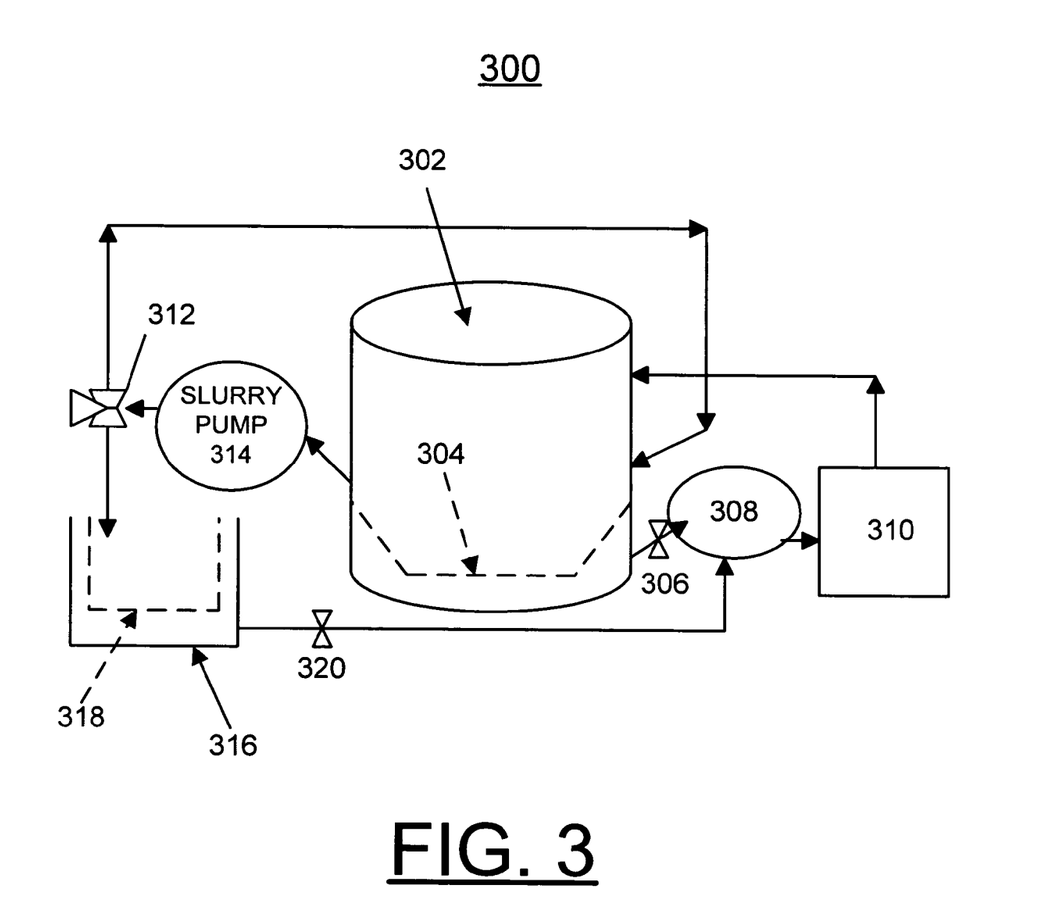
FIG. 3 is a schematic diagram of an exemplary first stage wash tank apparatus not to scale utilizing a slurry pump for separating mixed plastics in accordance with the present invention.

Small amounts of metallic pieces that will not be removed in a washing stage as illustrated and described with respect to FIG. 2 or FIG. 3 also sink, and will not be fluidized and will continue to build at the bottom of the tank. The ferrous portion of these metals can be removed using a magnet. The non-ferrous metal pieces will have to be manually removed when the tanks 104 are emptied or by using a ladle to scoop them out from time to time. The tank 104 is also equipped with the conical discharge line 152 for collecting the floating plastics and a siphon 150 to remove the sinking plastics. The conical discharge line 152 and the siphon 150 are further described below with respect to the collecting section 106.

In accordance with key features of the invention, the separation tank 104 has no moving parts and the tank 104 is not directly served by any moving parts. Therefore, shutdowns for scheduled or unscheduled maintenance are kept to an absolute minimum, and emptying the tanks 104 typically will not be required. Batch processing advantageously is replaced with a generally continuous operation.

In accordance with key features of the invention, the collecting section 106 is arranged for collecting floaters F and sinkers D from the separation tank 104. The floaters F will float toward the conical discharge line 152 which discharges to a perforated basket 154 installed inside a tank 156. The back one half of the discharge line 152 is equipped with a screen edge 158 that protrudes, for example, about 2 inches above the water level to prevent the floating plastics from passing over the discharge line 152 and building up behind it. A pair of nozzles indicated by arrows 160 discharges small streams of re-circulating solution from a tank indicated by E2 using the same solution return pump 144 are also used to push the floaters F toward the discharge line 152 in order to prevent them from building up on top of the water in the tank 104.

Compressed air or mechanical sweepers to sweep the floaters toward the discharge line 152 can also be used but they are more expensive to control and operate and generally require more maintenance. The collected floating plastics will be strained in the perforated basket 154 and the excess water will be pumped back by pump 144 after going through a screen filter 162, such as a $\frac{1}{16}$-inch screen filter. The floaters are conveyed out of the perforated basket using a pneumatic conveyor 164. When the floaters exit the pneumatic conveyor 164 indicated at an arrow labeled EXIT, are a final product they will be conveyed to a final washing/dewatering/drying station and then collected for shipping to their final destination. When the floaters require further separation and purification they will be conveyed to a next module 100 without rinsing or drying. The effects of the carry-over solution on the surface of the plastics are compensated for by automatic adjustment of the chemistry in the next receiving tank 104.

It should be understood that the basket assembly 154 in tank 156 could also be replaced by a perforated vibrating or non-vibrating screen conveyor. The sinkers are conveyed out of tank 104 using the siphon 150 which discharges over a perforated flat screen conveyor (not shown), or into a perforated basket assembly similar to basket 154 in tank 156 and filter 162. In either case the excess water that drains of the sinkers goes to tank 156 so that the water then drains from the floaters and from the sinkers are pumped back to tank 104 using the single water pump 144. The sinkers can also be discharged through the side of the tank 104 at a point such as point P shown in FIG. 1. Point P can be as low as the bottom 140 of the tank 104. A basket similar to basket 154 will be required which can drain into the same tank 156 so that only one pump will be required. Its location and diameter depend of the nature of the sinking species and on the composition of the mixed feed.

When the sinkers are a product they will be conveyed to a washing/dewatering/drying station and then collected for shipping to their final destination. When the sinkers require further separation and purification they will be conveyed to the next module 100 for further processing.

Referring now to FIG. 2, there is shown an exemplary wash tank apparatus generally designated by reference character 200 in accordance with the invention. Wash tank apparatus 200 is designed to accomplish three objectives that include wash the plastics, separate material having specific gravity less than about 1 and separate metals, glass, rocks and other undesirable heavy materials. Therefore, the design of this wash tank apparatus 200 is different than the rest of the separation tanks 104 of separation modules as illustrated in FIG. 1.

Mixed plastics are fed to a wash tank 202, which holds the cleaning solution, in the same way described above for tank 104. The specific gravity in this tank is generally about 1. The bottom of the tank 202 is fitted with a perforated basket 204, such as a $\frac{1}{8}$ inch perforated basket intended to hold very heavy materials that would not be readily fluidized by agitation or by circulating water to the tank 202, such as metals, glass, and stones. The basket 204 can be lifted out of the tank and emptied after a run is completed. Tank 202 is also equipped with an agitator 206. Water from near the bottom of the tank 202 is pumped, using a water pump 208 through a filter system 210 to trap dirt and other particulates smaller than about $\frac{1}{8}$ inch. The filtered water leaves the filter system 210 and is delivered to the tank 202 using a four-way nozzle 212 to create maximum agitation and turbulence in the tank 202. With high enough flow rate through pump 208, agitator 206 will not be necessary except for heavily soiled materials. For heavily soiled plastics, soaking of the plastics and/or agitation for an extended period of time in a batch mode while in Tank 202 may be required and can be provided with valve 214 in a closed position. A separate tank 216 containing a perforated basket 218 receives the washed mixed plastics. The mixed plastics are conveyed out of the perforated basket 218 with a screw conveyor 220.

The washing tank 202 is also fitted with a perforated plate (not shown) to isolate the zone where the oils and grease float from the region in the tank where the plastics float.

FIG. 3 illustrates another exemplary wash tank apparatus not to scale generally designated by reference character 300 utilizing a slurry pump 314 for separating mixed plastics in accordance with the present invention. Wash tank apparatus 300 similarly is designed to accomplish three objectives that include wash the plastics, separate material having specific gravity less than 1 and separate metals, glass, rocks and other undesirable heavy materials. Mixed plastics are fed to a wash tank 302, which holds the cleaning solution, in the same way described above for tank 104. The specific gravity in this tank is about 1. The bottom of the tank 302 is fitted with a perforated basket 304, such as a $\frac{1}{8}$ inch perforated basket intended to hold very heavy materials that would not be readily fluidized by agitation or by circulating water to the tank 302, such as metals, glass, and stones. The basket 304 can be lifted out of the tank and emptied after a run is completed. Water from near the bottom of the tank 302 is pumped, using a water pump 308 through a filter system 310 to trap dirt and other particulates smaller than $\frac{1}{8}$ inch. The filtered water leaves the filter system 310 and is delivered to the tank 302. The slurry pump 314 is used to recirculate a water and plastics mixture into the tank 304 through a valve 312. A separate tank 316 containing a perforated basket 318 receives the washed mixed plastics. The mixed plastics are conveyed out of the tank 316 and perforated basket 318 with a screw conveyor (not shown). A valve 320 is provided in a water return line connected between the bottom of the tank 316 and the water pump 308.

Wash tank apparatus 300 eliminates the need for an agitator and the nozzle as used in the wash tank apparatus 200. However, slurry pumps 314 are more expensive. For heavily soiled plastics, soaking of the plastics and/or agitation may be required. Depending on the level and nature of the dirt on the plastics, the washing process could be carried out in a continuous or in a semi-continuous mode. The washing tank 302 is also fitted with a perforated plate (not shown in Figure) to isolate the zone where the oils and grease float from the region in the tank where the plastics float.

After the washing process is completed in wash tank apparatus 200, or in wash tank apparatus 300, agitation can be temporarily stopped so that the plastics can be allowed to sink or float. This serves to accomplish the separation of the light plastics (specific gravity <1) in the same tank 202 or 302. The light plastics can then be transferred to the next stage 100 for further processing using the same techniques employed in tank 104 of FIG. 1. After the light plastics are recovered from the tank 202, 302 the sunken plastics can be transferred to the next stage 100 for further processing using a siphon similar to siphon 150 described for tank 104. This leaves behind small amounts of metals, glass and other heavy materials, which can be allowed to build in the tank 202, 302 for some time. The ferrous portion of these metals can be removed using a magnet. The non-ferrous metal pieces will be manually removed when the tanks 202, 302 are emptied or by, for example, using a ladle to remove the non-ferrous metal pieces from time to time.

In accordance with features and advantages of the separation apparatus 100 and wash tank apparatus 200, wash tank apparatus 300 over what is commonly considered the state of the art in flotation systems, the use of a combination of commercially available components and units enable, for example, about 50% reduction in cost. Batch processing also is replaced with continuous operation. Expensive slurry pumps, which require extensive maintenance, generally are replaced with a combination of siphons 150 and regular small pumps 144, 208, 308, for example, about 1 hp or less. Rectangular tanks are replaced with standard off-the-shelf circular tanks 104, 202, 302 with flat bottoms. Washing and drying between stages 100 are eliminated and the effects of carry-over solutions are compensated for by automatic adjustment of the chemistry in the receiving tank 104. Washing of the incoming plastics is accomplished in the same tank 202, 302 used in the first separation process. A single water pump 144 is used to pump the water that drains from the floaters and the sinkers back into the separation tanks 104. The washing process is designed to also separate metals and other heavy particles in the same tank 202, 302. Separation tanks 104 and wash tanks 202, 302 are made of polypropylene, polyethylene or polyvinyl chloride plastics.

Figure 4:
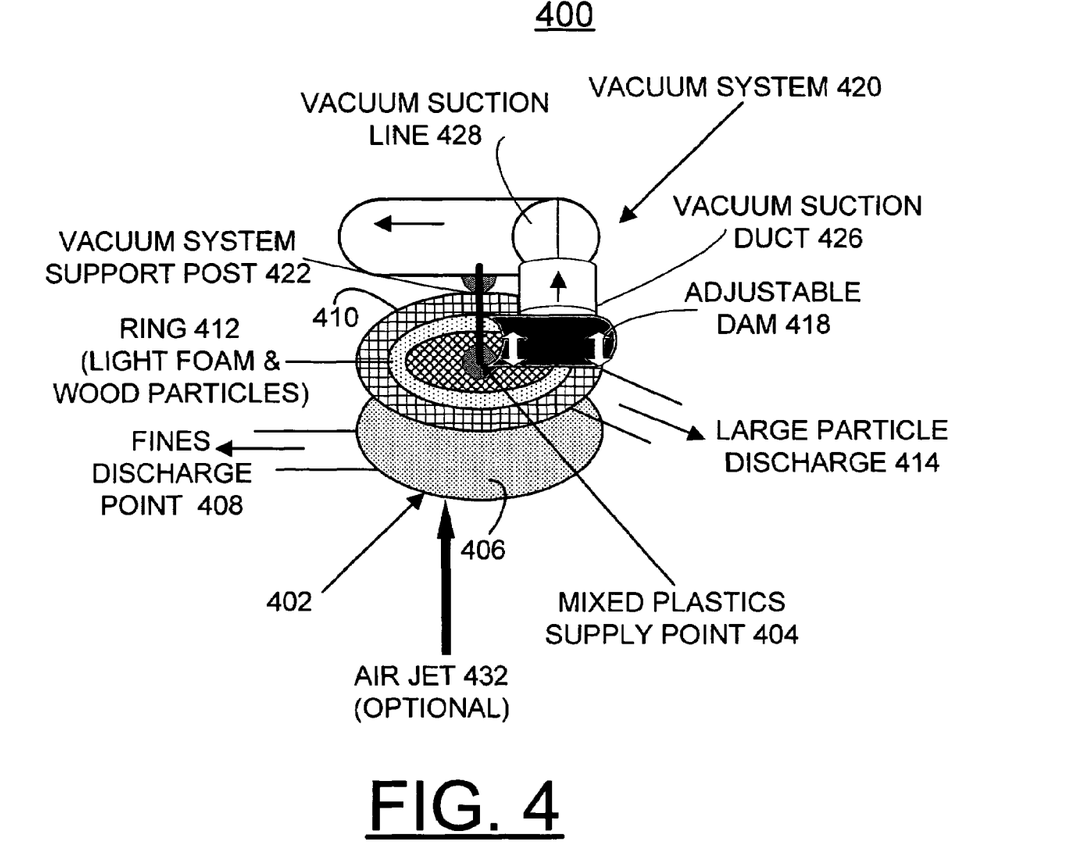
FIG. 4 is a schematic diagram of an alternative exemplary apparatus not to scale including an integrated vibrating screen and air classification system for separating mixed plastics in accordance with the present invention.

Referring now to FIG. 4, there is shown an alternative exemplary apparatus not to scale generally designated by reference character 400 for separating mixed plastics in accordance with the present invention. Separation apparatus 400 includes an integrated vibrating screen and air classification system generally designated by reference character 402. Separation apparatus 400 also is provided for improving the cleaning and classification of granulated mixed plastic waste in addition to the separation of the lights associated with such mixed waste. Granulated mixed plastic waste, resulting from the grinding of plastic articles for the recovery of the plastics often contains foamy light materials, wood chips, loose labels, paper chips and plastics fines, known as lights. These materials must be separated from the plastics stream before it can be processed and recycled.

The integrated vibrating screen set and air classification system 402 for making this separation is a round vibratory screen set in an enclosed circular enclosure, such as the separation tank 104 of FIG. 1. The mixed plastic waste is supplied through an opening 404 in the top center of the enclosed round vibratory screen set 402. Vibration of the screen set 402 causes the fines, for example, materials less that 2 mm, depending on screen size, to fall through a bottom screen 406 of the screen set 402 to the bottom of the integrated vibrating screen set and air classification system 402, where they are collected as indicated by fines discharge point 408. The vibratory action of the screen set 402 causes the plastics together with the foam light materials to migrate toward an outer periphery 410 of the screen set 402 where they are discharged as indicated at a large particle discharge 414. The lights must then be separated from the plastic product before further processing. During this vibratory separation process, the inventors noticed that the foamy light materials were forming a ring 412 over the spread plastics a few inches away from the screen edge 410 as shown in FIG. 4.

Separation apparatus 400 for the separation of the light materials from the plastic product, includes an adjustable dam 418, positioned over the spread plastics and light material to collect the light material and a vacuum system 420 over the screen behind the dam to recover the lights without any significant loss of the desired plastic products. The addition of this device with the vibrating screen set 402 accomplishes two separations, the fine removal and lights separation in a single step.

It should be understood that the present invention is not limited to the illustrated separation apparatus 400. For example, it should be understood that the present invention also applies to non-circular vibrating tables and screens.

The adjustable dam 418 can be fitted to the vibrating screen assembly 402 at a center support post 422 or at the outer wall of the screen set 402 or at both ends. A vacuum suction duct 426 coupled to a vacuum suction line 428 can be fitted to the adjustable dam 418 and used to separate the light material as it collects on top of the plastics behind the dam. The height of the dam 418, and the suction point 226 or plane above the plastics level can be adjusted to accommodate different compositions and different materials by sliding the dam up or down. The airflow rate and air velocity through the vacuum system can also be adjusted for different material densities and plastic chips weight. An upward air jet stream 432 can be introduced through the vibrating screen set 402 as shown below the screen set, to fluidize the lights away from the heavier plastic chips for more efficient separation.

Figure 5:
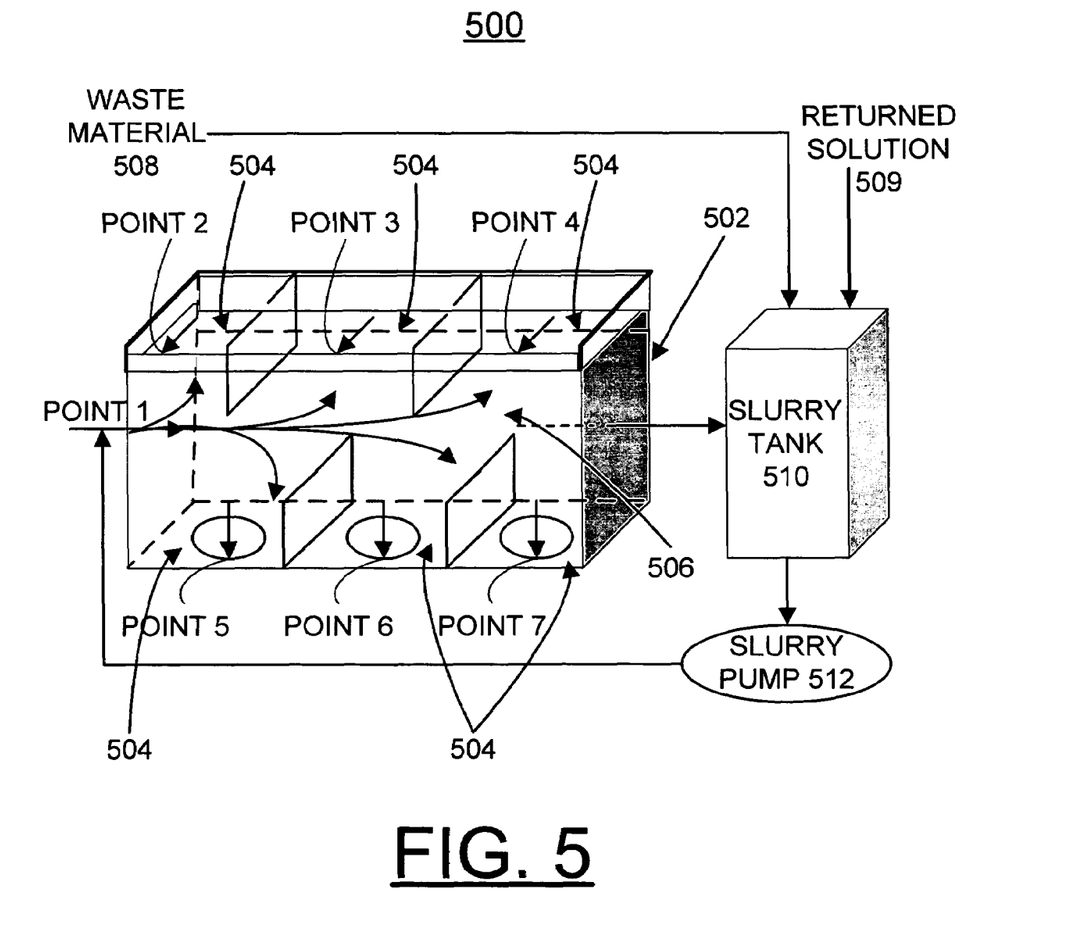
FIG. 5 is a schematic diagram of an alternative exemplary apparatus not to scale including a separation apparatus for separating mixed plastics of five different densities in accordance with the present invention.

FIG. 5 illustrates an alternative exemplary apparatus not to scale generally designated by reference character 500 for separating mixed plastics of five different densities in accordance with the present invention. Separation apparatus 500 includes a separation apparatus 502.

Separation apparatus 500 enables the separation and recovery of a number of different types of plastics or other materials from a mixture containing materials having different densities and/or other materials having similar density in the same mixture. In the separation apparatus 502, the rate at which chips of a given material rises or sinks will depend on the density of the material relative to the density of the solution. This happens because the fluid exerts on a submerged body an upward force that is equal to the weight of the fluid displaced by the body. Another force that acts on the submerged body is the gravitational force, which is equal to the weight of the body itself. When the upward force is greater than the gravitational force, the body will float, if not, the body will sink. For particles having the same volume, the larger the difference between the density of a solid particle and that of a liquid solution in which it is placed, the higher the net vertical or, up or down, force acting on the particle, and thus the higher the velocity at which the particle moves upward or downward in the liquid.

The separation apparatus 502 shown, as an example, is provided for separating a mixture of plastics of 5 different densities. As shown in FIG. 5, the separation apparatus 502 contains a plurality of upper and lower compartments 504, open to a central portion 506 of the separation apparatus 502. The waste material 508 and a returned solution 509 are applied to a slurry tank 510. The slurry tank 510 receiving the waste material 508 couples a slurry solution with a slurry pump 512 to the separation apparatus 502. Separation apparatus 502 includes a plurality of discharge ports labeled POINT 2 through POINT 7 within respective upper and lower compartments 504.

In accordance with a method of the invention, the addition of a horizontal component or velocity factor to the bodies to be separated or waste material 508 as they are injected at Point 1 into the central portion 506 of the separation apparatus 502 containing a separation solution of appropriate properties such as density, surface tension and pH. The velocity vector at which the plastics are injected, injection angle, apparatus dimensions, solution properties, number of stations, and solids loading in the slurry are determined based on the properties of the solids present in the mixture, number of species in the mixture 508, and number of cuts to be obtained. Placing the fluid in motion in the horizontal direction or at small angle with the horizontal (+ or −30°) or injecting the bodies into the fluid in the central portion 506 of the apparatus 502 under the influence of a horizontal force or at small angle with the horizontal (+ or −30°) can provide the necessary horizontal velocity and injection angle. Particles having different actual densities or apparent densities, if air bubbles are attached to the hydrophobic elements of the mixture, injected at the same horizontal velocity and injection angle into a liquid of specified properties, will float or sink at different settling velocities and rates. Therefore, the resultant velocity vector with which each type of particle moves will be different, so that, particles of different densities (actual or apparent) will rise or fall into the various compartments 504 in the separator apparatus 502. This principle can also be combined with froth flotation and other flotation techniques to separate mixtures of solid particles containing equal density materials as well as materials having different densities.

This principle was applied to develop and design a single tank process to separate mixtures of solid plastics and other particles when these particles have different densities. The same concept can be used with froth flotation solutions to separate mixtures containing solid particle having equal densities. The solid particles are slurryed in the solution in slurry tank 510 and the slurry is injected into the separation apparatus 502 using the slurry pump 512 as shown in FIG. 5. The different materials report to different stations at the top of the apparatus and overflow onto screen conveyors, or at the bottom of the apparatus and are conveyed using screw conveyors or pumped as a slurry out of the apparatus. The excess liquid or returned solution 509 is drawn out of the apparatus 502 and sent to the slurry tank 510 to be reused. Returned solution 509 includes liquid separated from the overflowing streams and from the bottom streams is also returned to the slurry tank.

Figure 6:
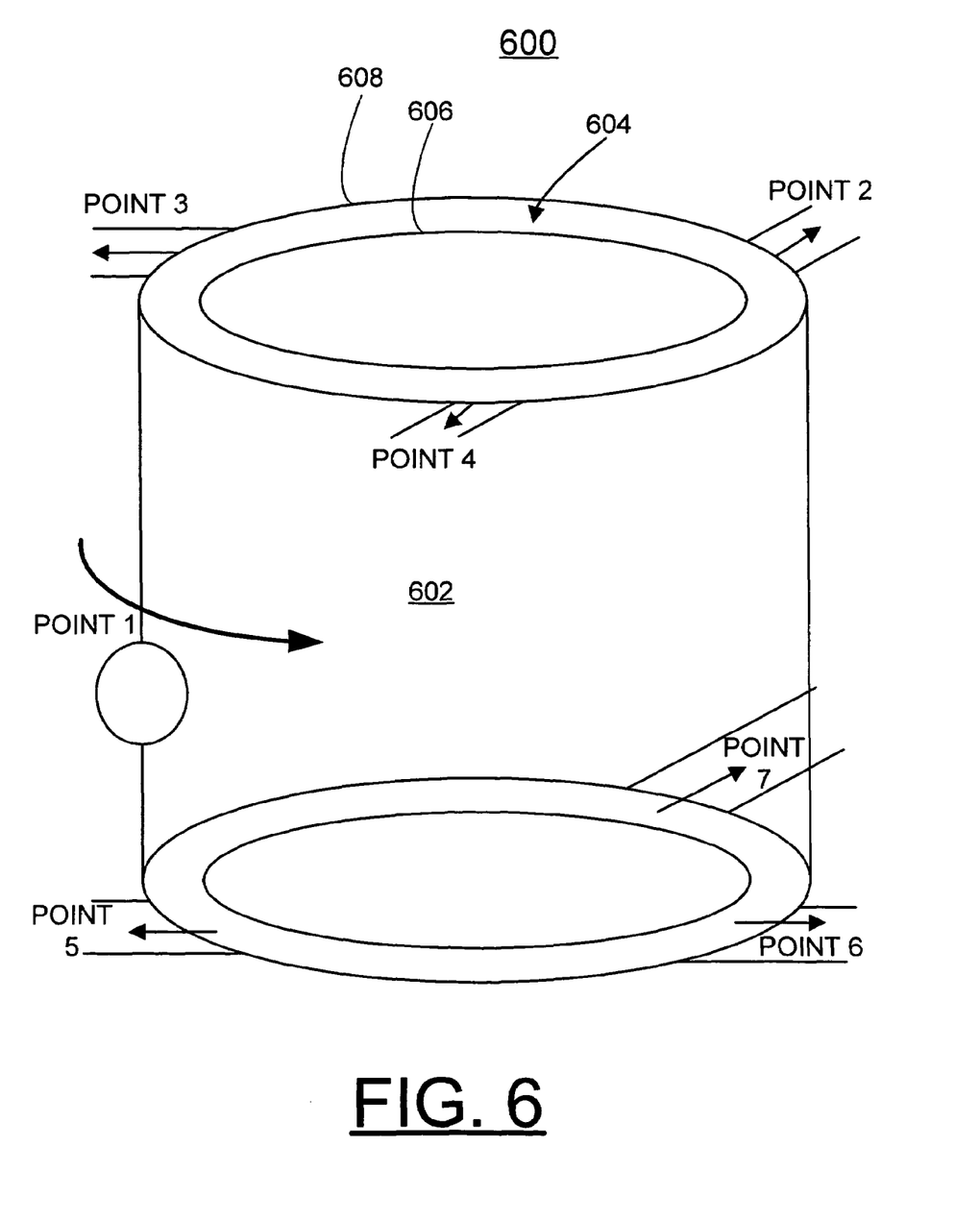
FIG. 6 is a schematic diagram of an alternative exemplary apparatus not to scale including a cylindrical separation apparatus for separating mixed plastics in accordance with the present invention.

FIG. 6 illustrates an alternative exemplary apparatus not to scale generally designated by reference character 600 for separating mixed plastics in accordance with the present invention. Separation apparatus 600 includes a cylindrical separation apparatus generally designated by reference character 602. Cylindrical separation apparatus 602 is another possible design to be used for the separation apparatus 502. The slurryed mixture is injected in the annulus 604 between a pair of concentric cylinders 606, 608 of the cylindrical separation apparatus 602. Cylindrical separation apparatus 602 includes a plurality of discharge ports labeled POINT 2 through POINT 7. Examples of how this process works for different mixtures are given below.

EXAMPLE NUMBER 1

Separation of a plastics mixture containing expanded polystyrene (very low density), polyolefin films (low density) and regular polystyrene (high density) and nylon (higher density).

The objective of this experiment was to separate the polyolefins (polypropylene and polyethylene) from the mixture. The plastics mixture was slurryed in tap water (density equals 1) and pumped into the apparatus at point 1 as shown in FIG. 6 at a predetermined velocity and injection angle. (The velocity, injection angle, apparatus dimensions, solution properties, number of stations, and solids loading in the slurry are determined based on the properties of the solids present, number of species in the mixture, and number of cuts to be obtained). The light expanded polystyrene floated faster than the polyolefins and reported to the first station in the apparatus at point 2. The polyolefins were rising at a slower velocity than the expanded polystyrene and they were collected at the second station of the apparatus at point 3. The heavier materials (regular polystyrene and nylons) sunk and were collected at point 4 in the apparatus. If there were appreciable amounts of the sinkers, they could have been collected at different points as they sink at different settling velocities by changing the density of the solution and relocating the baffles at the bottom of the tank. Tests were successfully conducted on this mixture with and without surfactants to control the surface tension.

EXAMPLE NUMBER 2

Separation of a plastics mixture derived from shredding appliances and containing rigid foam (very low density), polyolefins (low density), high impact polystyrene (HIPS), acrylonitrile-butadiene-styrene (ABS), nylons, Polyvinyl chloride (PVC) and metals (high density). The density scale was as follows: metals>PVC>nylons>(ABS and HIPS) >Polyolefins>foam This example is similar to what is produced from shredding refrigerators. In this case the liquid solution will be the solution disclosed in U.S. Pat. No. 5,653,867. This solution has a specified specific gravity, surface tension and pH. The solution is capable of modifying the surfaces of the equal density HIPS and ABS such that the HIPS float and the ABS sinks in the same solution. The material can be injected at point 1 in FIG. 5. The rigid foam is collected at point 2. The polyolefins is collected at point 3. The slower rising HIPS are collected at point 4. The slowly sinking ABS is collected at point 7. The heavier plastics, such as, nylon, PVC, and the like, would be collected at point 6. The heaviest of all, the metals, are collected in station 5. This example illustrates how a combination of conventional sink/float processes can be combined with other flotation techniques such as froth flotation processes to achieve multiple separations in a single tank apparatus.

EXAMPLE NUMBER 3

Separation of ash and sulfur bearing compounds from pulverized coal.

The ash portion of the coal has a higher density than the hydrocarbon fraction because it contains metals, metal oxides and other salts. In addition, work done on froth flotation to separate some of the sulfur bearing compounds from pulverized coal showed a promise to reduce the sulfur content of coal. The process developed here can achieve all that in one step.

In this case the liquid solution will be the froth flotation solution, which will have the appropriate specific gravity, surface tension and pH. The pulverized coal can be injected at point 1 in FIG. 5. The high sulfur fraction can be collected at point 2. The ash would be collected at point 5. The low sulfur coal particles can be collected at points 6 and 7. This is another example that illustrates how a combination of conventional sink/float processes can be combined with froth flotation and other flotation techniques to achieve multiple separations in a single apparatus.

EXAMPLE NUMBER 4

Separation of a plastics mixture derived from automobile shredder residue (ASR) and containing foam and wood (very low density), polyolefins (low density), HIPS, ABS, nylons, ABS/PC, PC, Poly Vinyl Chloride and metals (high density).

The plastics mixture can be slurryed in the same brine solution used in the separation apparatus (specific gravity of about 1.1-1.2 and the surface tension could be lowered when necessary to the 30-40 dyne/cm range, using surfactants). The slurry is then pumped into a tank at point 1 as shown in FIG. 5 at a predetermined velocity. The light foam and wood material will float first and will be collected at point 2. (Separation of the two materials may not be necessary so the apparatus will be set for the two to report to the same station). The polyolefins will be rising at a slower velocity than the foam and will flow out of the apparatus at point 3. A mixture of ABS and HIPS will float at a yet slower velocity and will be collected at point 4. The metals will sink first and will report to station number 5 in FIG. 5, and the PVC will sink and will flow out of the apparatus at point 6. Additional receiving stations can be set between 6 and 7 to receive the PC and the ABS/PC fractions. The nylons will be collected at station number 7. This example illustrates how this apparatus can be used to concentrate the desired plastics in more manageable fractions for further separation.

Some other design modifications can be made to the system when needed as follows. The slurryed material can be fed to the tank at point 1 in FIG. 6 through a pipe or through a channel or multiple pipes and/or channels depending upon the size of the tank. The channel or channels can be designed to deliver mixed materials through the entire width of the tank. The floating materials can be made to overflow from one side of the tank as shown in FIG. 5 or through both sides of the tanks. In both cases, air jets, paddle wheels, or other sweepers can be installed to assist the floating solid particles overflow at a uniform rate and not to stagnate on top of the tank. Air jets can be injected at different points in the tank to assist in directing the separating particles and/or to increase their flow rate. Small intermediate stations can be set-up between the main stations to collect mixed particles of materials collecting in the main adjacent collection stations in order to increase the purity of the fractions in the main stations. Materials collected in the intermediate stations can be mixed with new feed material and re-run through the separation process.

In accordance with features of the invention, the process will reduce equipment cost and plant footprint substantially because it reduces the number of tanks, dewatering stations, washing stations, and drying stations required down to 1 of each. It also reduces the number of transfer conveyors, pumps, valves and control and monitoring systems by about 50%. The process will reduce the amount of wastewater and waste solutions generated substantially because all fractions will contain the same solution and can be rinsed using the same rinse water. The process will reduce labor requirements because it eliminates all material handling and transfer between stages because now the entire process is a single stage. This will also reduce the amount of solid waste generated by the overall process. The process allows the operator to run many different waste streams with only resetting the baffles that separates the collection stations, changing the solution chemistry and may be the pump velocity and/or the injection angle.

While the present invention has been described with reference to the details of the embodiments of the invention shown in the drawing, these details are not intended to limit the scope of the invention as claimed in the appended claims.

What is claimed is:

1. Apparatus for separating mixed plastics using flotation techniques comprising:
   a first stage initial washing tank for washing incoming plastics and providing a first separation process; said first stage initial washing tank includes a perforated basket to hold heavy materials; and
   at least one separation module; said separation module including
   a separation tank, said separation tank having no moving parts; said separation tank being a generally circular tank and having a substantially flat bottom; said separation tank containing a separation solution: said separation tank having a discharge line for collecting floaters and a siphon for collecting sinkers;
   a feeding section coupled to the separation tank for feeding of mixed plastic stream into the separation tank; said feeding section including a circular feeding tube extending into said separation tank; and said circular feeding tube including a portion located below a level of said separation solution in the separation tank; and
   a collecting section for collecting a plurality of separated mixed plastics including floaters and sinkers from the discharge line and the siphon provided with the separation tank.

2. Apparatus for separating mixed plastics as recited in claim 1 wherein said first stage initial washing tank is a circular tank with a substantially flat bottom.

3. Apparatus for separating mixed plastics as recited in claim 1 includes a pump for recirculating said separation solution used with said separation tank; said separation solution including water.

4. Apparatus for separating mixed plastics as recited in claim 1 wherein said circular feeding tube extending into said separation tank includes a generally enlarged portion extending above said solution in the separation tank; and a discharge member attached to an end of said feeding tube portion located below a level of said solution in the separation tank; said discharge member disposed at a selected angle to reduce discharge velocity and limit the turbulence to an area adjacent to said discharge member.

5. Apparatus for separating mixed plastics as recited in claim 1 wherein said feeding section includes a screw conveyor for feeding of the mixed plastic stream into said circular feeding tube.

6. Apparatus for separating mixed plastics as recited in claim 1 wherein said feeding section includes a pneumatic feeder for feeding of the mixed plastic stream into said circular feeding tube.

7. Apparatus for separating mixed plastics as recited in claim 1 wherein said feeding section includes a slurry pump for feeding a mixed plastic slurry into said circular feeding tube.

8. Apparatus for separating mixed plastics as recited in claim 1 wherein said separation tank includes a stream of recirculating separation solution for moving a separated plastic toward said siphon.

9. Apparatus for separating mixed plastics as recited in claim 1 further includes a stream of recirculating separation solution for moving a separated plastic toward a discharge line.

10. Apparatus for separating mixed plastics as recited in claim 1 includes at least one stream of compressed air for moving a separated plastic toward a collection point.

11. Apparatus for separating mixed plastics as recited in claim 1 includes an integrated vibrating screen and air classification system for separating lights from the mixed plastics stream; said lights including at least one of foamy light materials, wood chips, loose labels, paper chips and plastics fines.

12. Apparatus for separating mixed plastics as recited in claim 11 wherein said integrated vibrating screen and air classification system includes an adjustable dam carried by a vibrating screen.

13. Apparatus for separating mixed plastics as recited in claim 11 wherein said integrated vibrating screen and air classification system includes a vacuum system carried by a vibrating screen.

14. Apparatus for separating mixed plastics as recited in claim 11 wherein said integrated vibrating screen and air classification system includes an air jet stream provided through a vibrating screen to enhance mixed plastic separation.

15. A method for separating mixed plastics using flotation techniques comprising the steps of:
providing a first stage initial washing tank including a perforated basket to hold heavy materials;
washing incoming plastics and providing a first separation process in the first stage initial washing tank; and
providing at least one separation module including a separation tank having no moving parts; a feeding section; and a collecting section;
providing said separation tank with a generally circular tank and a substantially flat bottom; said separation tank containing a separation solution; providing said separation tank with a discharge line for collecting floaters and a siphon for collecting sinkers;
providing said feeding section with a circular feeding tube extending into said separation tank; and providing said circular feeding tube with a portion located below a level of said solution in the separation tank;
feeding a mixed plastic stream into the separation tank using the feeding section of the separation module; and
collecting separated mixed plastics including floaters and sinkers from the discharge line and the siphon provided with the separation tank using the collecting section of the separation module.

16. A method for separating mixed plastics as recited in claim 15 further includes the steps of providing a stream of separation solution for moving a separated mixed plastic toward a collection point.

17. A method for separating mixed plastics as recited in claim 15 further includes the steps of providing an air jet stream for separating mixed plastics and moving a separated plastic toward a collection point.

18. A method for separating mixed plastics as recited in claim 15 further includes the steps of providing a circular tank with a substantially flat bottom for said first stage initial washing tank.

* * * * *